United States Patent [19]

Langer

[11] Patent Number: 4,685,848

[45] Date of Patent: Aug. 11, 1987

[54] GEAR HEADED FASTENER AND DRIVE TOOL STRUCTURE

[76] Inventor: Alfred C. Langer, P.O. Box 148, Brookfield, Conn. 06804

[21] Appl. No.: 700,835

[22] Filed: Feb. 12, 1985

[51] Int. Cl.⁴ .................... F16B 23/00; F16B 35/06
[52] U.S. Cl. .................................. 411/402; 411/403; 411/407; 411/427; 411/378; 81/57.29
[58] Field of Search ................. 411/402–405, 411/407, 378, 427; 81/55–57, 57.29, 436, 451, 460, 461, 16

[56] References Cited

U.S. PATENT DOCUMENTS

| | | |
|---|---|---|
| 137,910 | 4/1873 | Gibbs . |
| 602,054 | 4/1898 | Butler ................................ 81/56 |
| 1,167,242 | 1/1916 | Wright . |
| 1,645,570 | 10/1927 | Anderson ........................... 81/57.29 |
| 1,653,531 | 12/1927 | Affleck et al. . |
| 1,788,014 | 1/1931 | Coup ................................. 81/57.29 |
| 1,832,663 | 11/1931 | Small ................................ 81/57.29 |
| 2,199,802 | 5/1940 | Leitz, Jr. et al. .................. 411/393 |
| 2,475,606 | 7/1949 | Gagnon ............................. 81/57 |
| 2,541,772 | 2/1951 | Lockard ............................ 411/366 |
| 2,583,266 | 1/1952 | Jenson ............................... 81/57.29 |
| 2,814,059 | 11/1957 | Lehning ............................ 411/402 |
| 2,984,134 | 5/1961 | Modin ............................... 81/53 |
| 4,416,561 | 11/1983 | Fischer ............................. 411/427 |
| 4,515,043 | 5/1985 | Gray ................................. 81/57.29 |

FOREIGN PATENT DOCUMENTS

| | | | |
|---|---|---|---|
| 63979 | 9/1945 | Denmark . | |
| 1356877 | 2/1964 | France .............................. 411/427 |
| 124018 | 3/1944 | Sweden . | |
| 1463496 | 2/1977 | United Kingdom ............. 411/402 |

Primary Examiner—Thomas S. Houco
Assistant Examiner—Suzanne L. Dino

[57] ABSTRACT

A rotatable fastener has a head portion with an axially facing ring gear engageable with a complementary gear of a drive tool. In a preferred embodiment, the ring gear is a rearwardly facing beveled gear for use with a beveled drive gear and the head portion defines a forwardly directed thrust surface engageable by a bearing surface of the drive tool to urge the drive gear against the ring gear. In another embodiment, the fastener has a telescoping structure in which an internally threaded torque element is slidably received within a central passage of the head portion.

16 Claims, 10 Drawing Figures

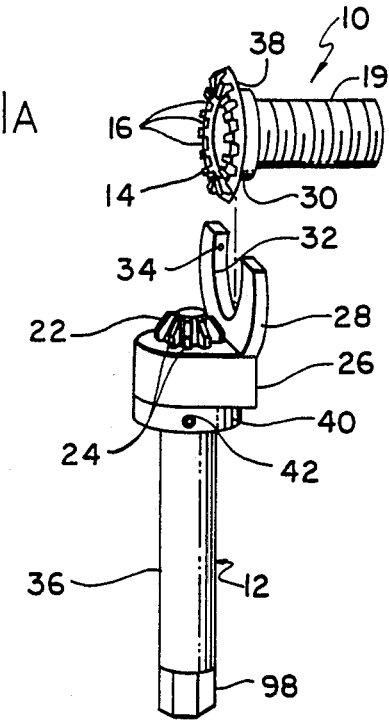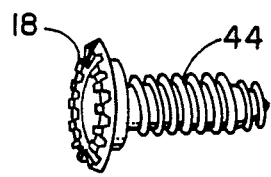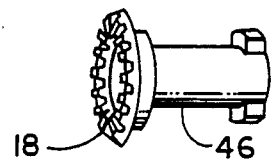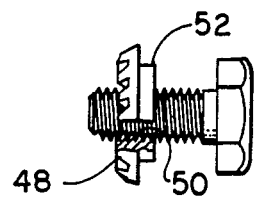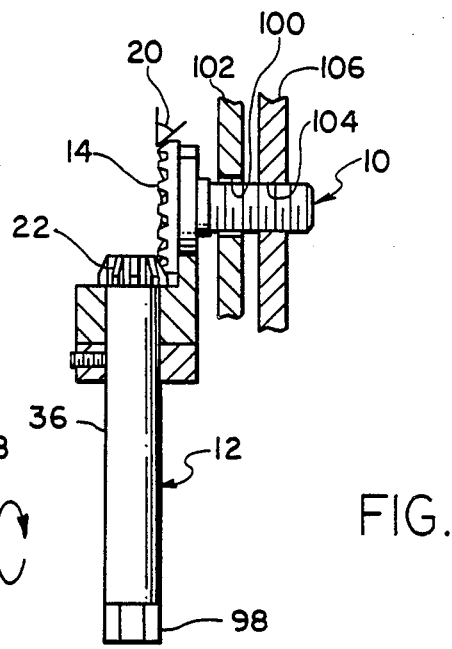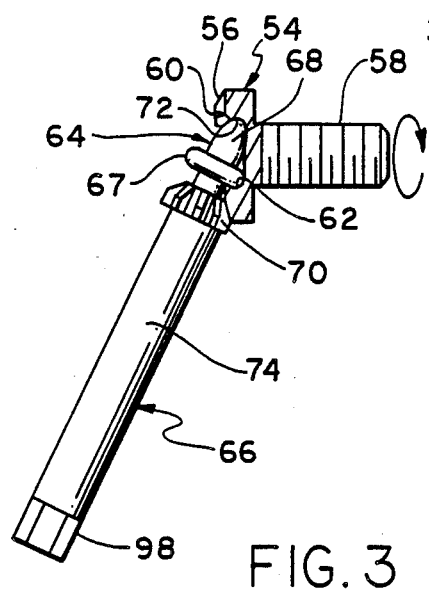

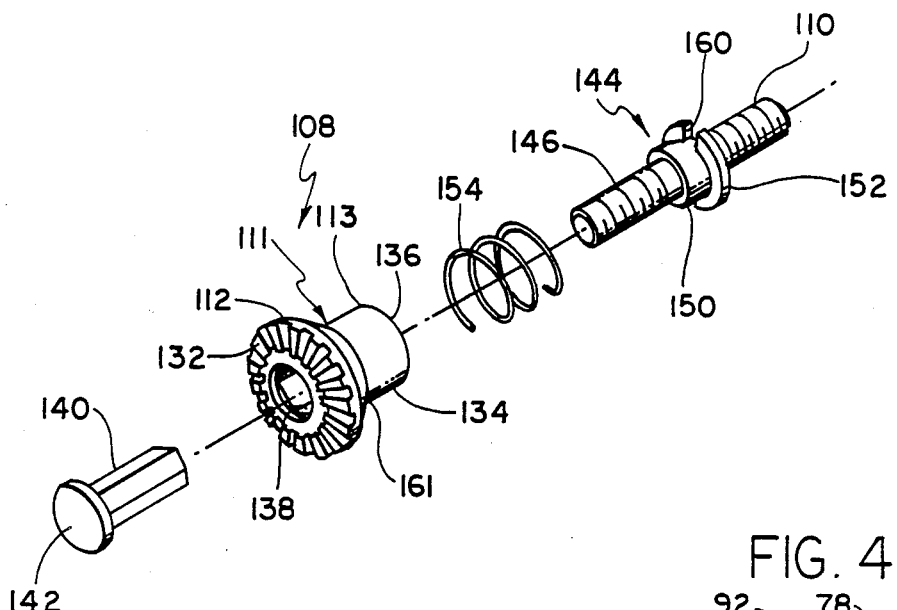
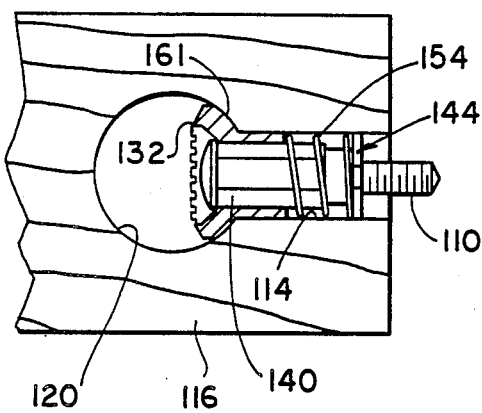
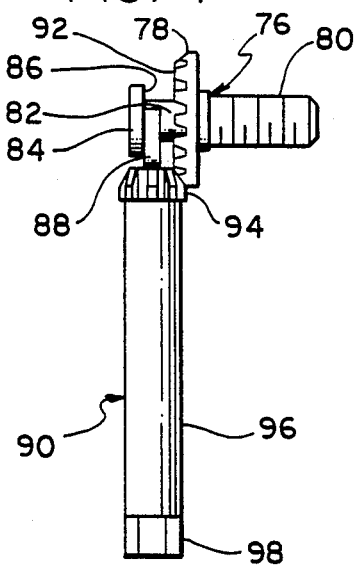
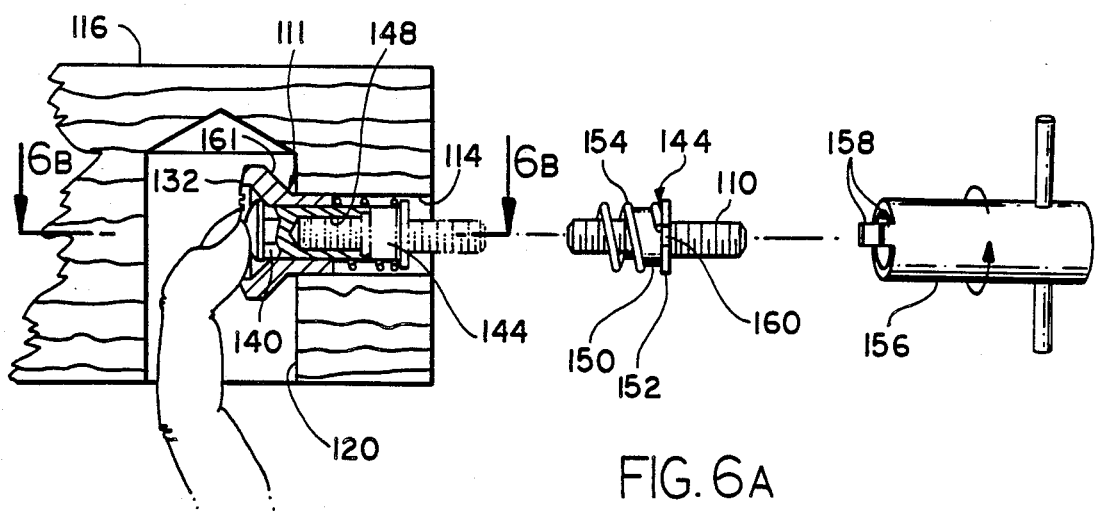

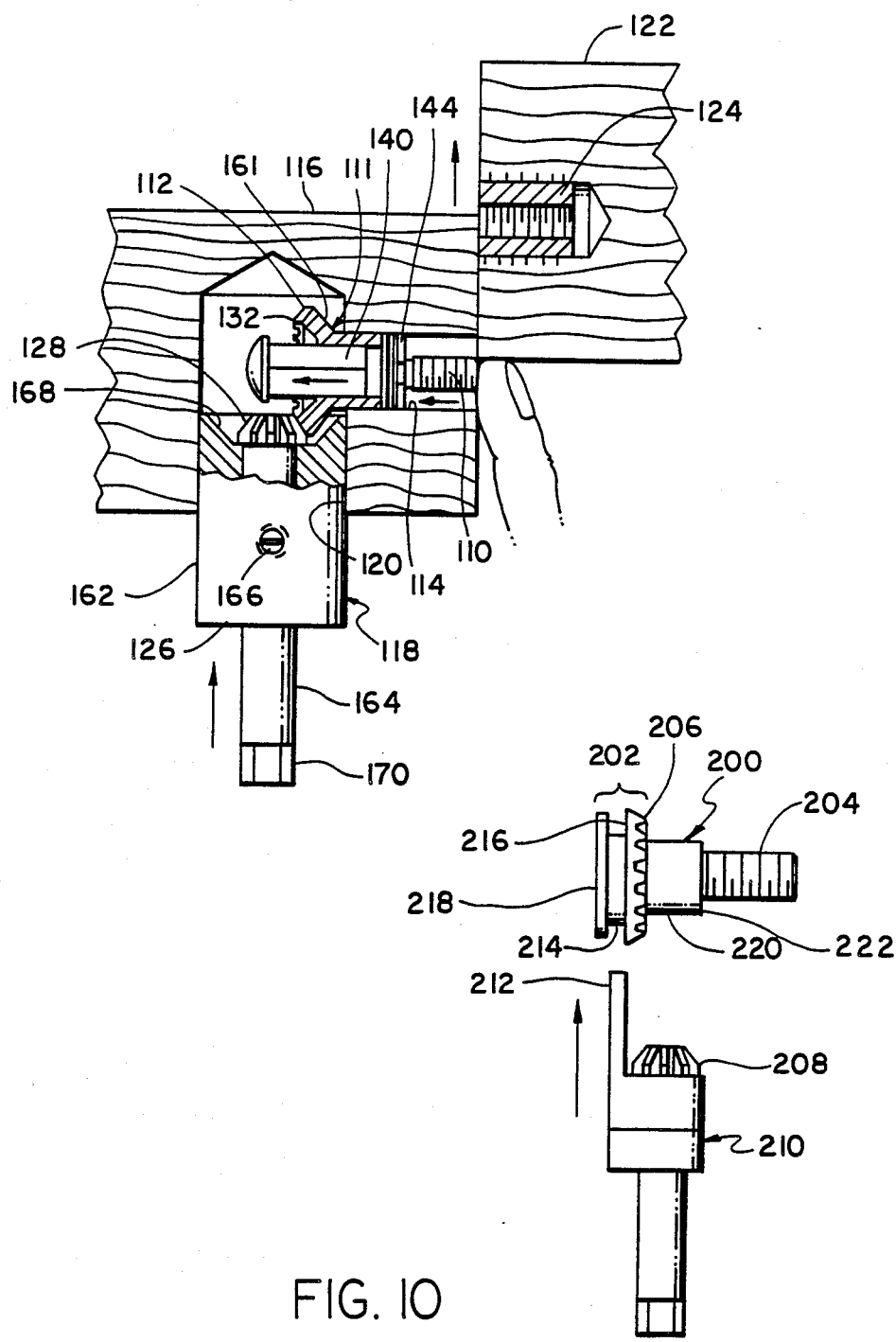

GEAR HEADED FASTENER AND DRIVE TOOL STRUCTURE

BACKGROUND OF THE INVENTION

The present invention relates generally to the fastener art and, more particularly, to improved gear-headed fasteners drivable from a substantially perpendicular direction by a rotary drive tool.

It is often desirable to drive a threaded fastener from a direction perpendicular to its axis, especially when space in the area of the fastener head is restricted. One troublesome case is the joining of furniture members or stair rails so that the fastener is contained with the objects being joined and is hidden from view. Even if the fastener can be positioned within a blind opening in one of the objects, it is difficult to tighten the fastener unless a large open area is provided near its head. Currently available fasteners and fastener drive tools are generally unsatisfactory for this purpose.

Prior tools for tightening fasteners from a direction perpendicular to the fastener axis include open end, box end and socket wrenches. However, such wrenches are unsuitable for use in many cases because open space is required to: (1) insert the fastener linearly into the clearance opening along its full length; (2) fit the wrench over the head of the fastener in the unthreaded condition; and (3) swing the tool back and forth within a perpendicular plane in a tightening sequence. The operating tool must also be repeatedly engaged, disengaged and reengaged with the head of the fastener if a ratchet device is not used.

An improved form of fastener is described in Danish Pat. No. 63979 and Swedish Pat. No. 124018. The fastener disclosed therein has a plurality of gear teeth projecting radially from its shank to form a worm wheel engageable with a worm gear of a rotary drive tool. The fastener can be driven from a direction 90 degrees to its axis, but requires a substantial amount of open space adjacent to the gear teeth because the axis of the drive tool is displaced from the axis of the fastener and the tool has laterally projecting prongs which must engage the fastener.

One form of attaching hardware designed specifically for stair rails and furniture members is a "hanger bolt" having a wood screw shank at one end and a machine screw shank at the other end. The wood screw shank is driven into one object and the machine screw shank projects through a clearance opening in another object, such that the end of the machine screw thread is accessible through an access hole at right angles to the clearance hole. Fastening is completed by a star nut introduced into the access hole and tightened onto the machine screw shank by repeatedly forcing a screwdriver against the points of the star. This is a laborious operation and requires that the objects be assembled progressively, using whatever additional space is required to accommodate the length of the screw thread. Objects cannot be assembled by this method within their combined length.

As a result of the difficulties encountered in attaching objects by the above described methods, carpenters assembling stair rails often discard traditional fasteners and resort to toe-nailing the rails together or to the newel posts supporting them, and gluing the rails together. This makeshift alternative is unsightly and inexact, and often results in an unsafe assembly.

Therefore, it is desirable in many applications to provide an apparatus for securely fastening two objects together within their combined length using a drive tool extending through a restricted access opening in one of the objects and directed at right angles to the fastener axis.

SUMMARY OF THE INVENTION

The fastener of the present invention is rotatable by a drive gear for engagement with a workpiece in a preselected forward direction. It comprises: a fastener body extending from a head portion to a forward end in the preselected direction, the head portion defining an axially facing ring gear for engagement with the drive gear. Each tooth of the ring gear has a height and a length, the height extending substantially parallel to the axis of the fastener and the length extending substantially radially from that axis. In the preferred embodiment, the ring gear is a rearwardly facing beveled gear for engagement with a beveled drive gear and has a forwardly directed thrust surface engageable by a bearing surface portion of the drive tool to urge the drive gear forwardly against the ring gear. Alternatively, the ring gear may face in the forward direcion and the thrust surface may be directed rearwardly. In either case, the head of the fastener may have a tapered forward surface portion for engagement with the walls of an access bore in an object to be fastened to the workpiece.

In one variation, the fastener is a telescoping structure in which the fastener body defines a central axial passage for sliding reception of an element shaped for transmission of torque from the head portion. A coupling element having an outwardly directed threaded shank is engageable with the torque element and biased by a compression spring such that the shank rotates with the gear head portion and the shank is yieldingly urged away from it.

A further variation of the invention incorporates a drive tool having an annular collar supporting the drive gear for rotation. The collar may have a cylindrical portion for engagement of the walls of the access opening in an axial orientation and/or an outer tapered portion engageable with walls of the opening at various angles with its axis. The tapered surface portion enables the drive tool to "follow" the gear head of the fastener as it advances in a perpendicular direction during tightening, and to urge the drive gear constantly against the fastener gear head. This is especially desirable when the fastener does not have a telescoping capability.

The fastener and drive tool structures of the present invention enable a fastener to be securely tightened through a single access bore at right angles to the axis of the fastener and coplanar with it. The fastener and drive tool structures also assure that the drive gear remains engaged with the fastener head during tightening.

The telescoping fastener is particularly useful in cases in which objects must be assembled within their combined length. For example, two portions of a stair rail can be connected in end to end relationship without moving either portion axially because the threaded shank can be retracted within the end of one object by a slight inward finger pressure. A second object can then be slid laterally over the end of the first object until the shank is aligned with a threaded portion of the second object. The fastener spring biases the shank against the second object as the fastener is rotated.

BRIEF DESCRIPTION OF THE DRAWINGS

The above and other features of the present invention may be more fully understood from the following detailed description, taken together with the accompanying drawings, wherein similar reference characters refer to similar elements throughout and in which:

FIG. 1A is a perspective view of an exemplary embodiment of a fastener and drive tool constructed in accordance with the invention, showing the tool disengaged from the fastener;

FIG. 1B is a perspective view of a second exemplary embodiment of a fastener in accordance with the present invention, wherein the fastener has a wood screw shank;

FIG. 1C is a perspective view of another embodiment of a fastener having a bayonet-type shank;

FIG. 1D is a side elevational view of a further embodiment in which the fastener is a gearheaded nut;

FIG. 2 is a partial vertical sectional view of the fastener and drive tool of FIG. 1A, in engagement with each other and with a pair of objects being fastened together;

FIG. 3 is a partial vertical sectional view of another embodiment of fastener and drive tool constructed in accordance with the invention;

FIG. 4 is a side elevational view of yet another embodiment of the fastener and drive tool combination;

FIG. 5 is an exploded perspective view of a four-piece telescoping fastener constructed in accordance with still another embodiment of the present invention;

FIG. 6A is an exploded partial sectional view of the fastener of FIG. 5, positioned in an object to be fastened and shown in conjunction with a tool for assembling the fastener within the object;

FIG. 6B is a partial horizontal sectional view taken in the direction 6B—6B of FIG. 6A;

FIG. 7A is a partial vertical sectional view showing the fastener of FIG. 5 and a corresponding drive tool constructed in accordance with the present invention, within a primary object as it is moved laterally into alignment with a threaded bore of a secondary object;

FIG. 10 is a side elevational view of a fastener and drive tool constructed in accordance with still another embodiment of the invention.

DESCRIPTION OF THE PREFERRED EMBODIMENTS

Figure 7B:
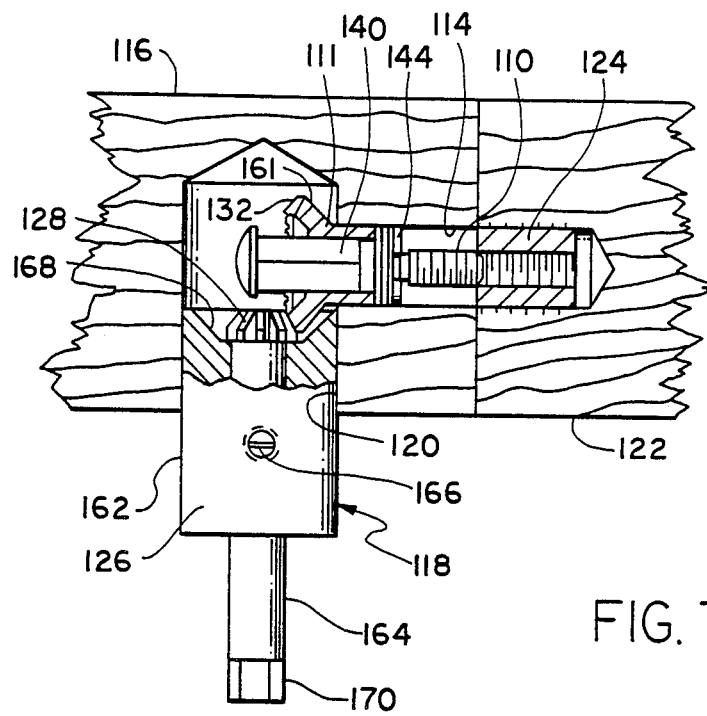
FIG. 7B is a partial vertical sectional view showing the fastener and drive tool of FIG. 7A at the beginning of the fastening operation.

Referring now to the drawings, specifically FIGS. 1A and 2, a fastener 10 and a rotary drive tool 12 constructed according to a preferred embodiment of the present invention are operable at approximately right angles to fasten other objects together with the axes of rotation of the fastener and the drive tool located within a common plane. The fastener 10 has a ring gear 14 made up of a plurality of gear teeth 16, and faces substantially axially from a fastener head 18. A machine screw shank 19 extends in a forward axial direction from the fastener head. The ring gear 14 is beveled at an angle 20 (FIG. 2) for engagement with a beveled drive gear 22 of the drive tool.

Each of the gear teeth 16 has a height which defines the outward extent of the tooth from the surface of the fastener head 18 and a length which defines the extent of the tooth in a direction parallel to the fastener head. The teeth are bevelled for ease of engagement with the drive gear 22 and are arranged in a circular pattern on a substantially axially directed surface of the fastener head. The height of each tooth extends substantially axially from the head and the length of each tooth extends substantially radially along the head. That is, the height has a substantial axial component and the length has a substantial radial component, as opposed to a spur gear or a worm wheel in which the gear height has no appreciable axial component and the gear length has no appreciable radial component. In this context, the bevelled ring gear 14 is defined as "facing" in a substantially axial direction.

In the embodiment of FIGS. 1A and 2, the ring gear 14 faces substantially rearwardly from the fastener head. However, the gear may face forwardly from the head without deviating from the teachings of the invention, as discussed below in the context of FIG. 10.

The drive gear 22 is preferably a pinion-type gear having beveled teeth 24 which are engageable in driving relationship with the teeth 16 of the ring gear 14 within a preselected range of angles. The drive gear is mounted for rotation within a supporting structure 26 having an offset yoke 28 receivable over a shoulder 30 of the fastener head. The yoke has a circular recess 32 which closely receives the shoulder 30 and is held on the shoulder by a detent ball 34 which passes slightly beyond the center of the shoulder. The structure 26 and the yoke 28 remain stationary as the drive gear 22 rotates with a drive shaft 36. In the embodiment of FIGS. 1A and 2, the yoke bears against a forwardly facing thrust surface 38 to hold the drive gear 22 against the ring gear 14 and in a condition of engagement therewith. The supporting structure 26 is retained on the shaft 36 by a collar 40 and a set screw 42.

Although the fastener 10 of FIG. 1A has a machine screw shank 19, the fastener of the present invention may take the form of any other suitable fastening structure having an axially facing gear head. Thus, the fasteners of FIGS. 1B and 1C are provided with a wood screw shank 44 and a bayonet lug-type shank 46, respectively. The fastener of FIG. 1D is a nut having a rearwardly facing beveled ring gear 48 and a threaded bore 50. A shoulder 52 at the forward end of the nut is the same in structure and function as the shoulder 30 of the head 18.

FIGS. 3 and 4 illustrate alternative embodiments of the fastener and drive tool structure of FIG. 1A, with corresponding drive tools engaging differently shaped thrust surfaces of the fastener elements. FIG. 3 shows a fastener 54 having a head 56, a beveled ring gear 60 at the rearward end of the head, and a threaded shank 58. A circular undercut recess 62 at the center of the ring gear receives an end portion 64 of a drive tool 66. The end portion 64 has an annular ridge 67 and a blunt end 68 for engagement with opposite sides of the recess 62 when an associated drive gear 70 is engaged with the ring gear 60. Because the recess 62 is undercut, a relatively small, generally forwardly-facing annular surface 72 is formed at its open end. This surface 72 engages the blunt end 68 and the annular ridge 67 to hold the drive gear forwardly against the ring gear in a condition of engagement therewith. The drive gear is carried for rotation with a shaft 74 of the tool, and the end portion 64 is mounted for rotation relative to the drive gear. This leaves the end portion 64 free to rotate or remain stationary as fastening occurs.

FIG. 4 illustrates a fastener 76 having a head portion 78 with a forwardly directed threaded shank 80 and a rearwardly directed shank 82. An enlarged portion 84 at the rearward end of the shank 82 defines a forwardly facing surface portion 86 for engagement by a yoke 88 of a drive tool 90. The head portion of the fastener comprises a beveled ring gear 92 which is similar in structure to the ring gear 14 of the fastener 10 (FIG. 1A) and is engageable with a pinion-type gear 94 of the drive tool. The forwardly facing surface portion 86 serves the same purpose as the shoulder 30 and the recess 62 of the embodiments discussed above, forcing the yoke 88 and thus the drive gear 94 forwardly against the ring gear 92. The drive gear 94 is carried for rotation with a drive shaft 96, and the yoke 88 is freely rotatable relative to the drive gear.

In operation, the fasteners of FIGS. 1-4 may be inserted within a desired clearance hole of a first object and turned by hand to threadingly engage a second object or workpiece to be joined thereto. In this sense, the term "workpiece" will be understood to mean either the body of the second object being joined, as in the case of an object engaged directly by a threaded shank or containing a threaded insert engaged by such a shank, or a separate complementary fastener located on the opposite side of the second object. Once the fastener is engaged, the drive tool is applied by operatively engaging its yoke 28, end portion 64 or yoke 88, with a forwardly facing thrust surface of the fastener. This holds the drive gear forwardly in operative engagement with the ring gear of the fastener. The drive shaft of the fastener is turned at a hex end or other suitable connecting portion 98 of the tool shaft to advance the fastener into secure engagement with the workpiece. Typical objects to be fastened together by the structures of FIGS. 1-4 are shown in FIG. 2, wherein the fastener 10 passes through a clearance opening 100 in a plate or other primary object 102 for engagement with a threaded opening 104 in a secondary object 106.

Figure 7C:
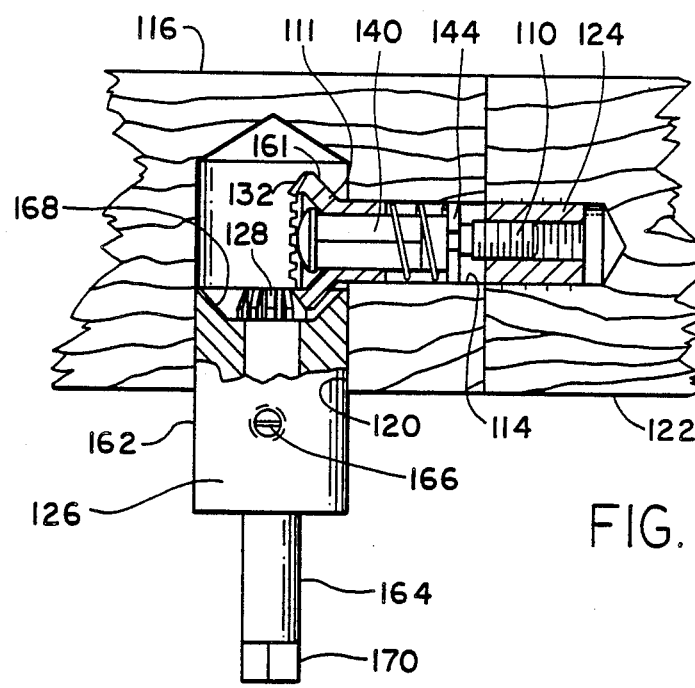
FIG. 7C is a partial vertical sectional view corresponding to FIG. 7B, showing the fastener in the fastened condition.

Referring now to FIGS. 5-7, another embodiment of the present invention includes a gearheaded fastener 108 having a forwardly directed threaded shank portion 110 which is retractable telescopically relative to a fastener body 111 and is spring biased in the forward direction. The fastener body extends from a head portion 112 to a forward end 113. As illustrated most clearly in FIGS. 6 and 7, the fastener is assembled within a primary or clearance opening 114 of a primary object 116, such that the head portion is accessible by a drive tool 118 through an access bore 120 which is perpendicular to and intersects the clearance opening. The telescopic nature of the fastener permits the threaded shank to be retracted entirely within the clearance opening, without dislodging the head portion 112 (FIG. 7A), such that a secondary object 122 can be moved laterally over the clearance opening to align a threaded insert 124 with the shank of the fastener (FIG. 7B). The drive tool 118 is inserted within the access bore 120 to drive the fastener and its threaded shank 110 into a condition of full engagement with the insert 124 (FIG. 7C). An annular supporting collar 126 of the drive tool 118 engages the interior of the access bore 120 to hold a pinion-type drive gear 128 of the tool against the fastener head portion 112.

Referring to FIGS. 5, 6A and 6B in greater detail, the head portion 112 of the fastener body 111 has a rearwardly facing beveled ring gear 132 which is similar to the ring gear 14 of FIG. 1A. A hollow shank 134 extends forwardly from the head portion to the forward end 113, and terminates in a flat annular surface 136. The shank 134 defines a central passage 138 which may be of hexagonal or other noncircular shape for sliding reception of a complementary torque transmitting element 140. Thus, the element 140 is "keyed" to the head portion, in the sense that torque applied to the head portion is transferred to the element 140 without impeding axial sliding movement. The torque transmitting element 140 has an enlarged head 142 which prevents the element from passing entirely through the head portion 112 in the forward direction, but does not impede access to the ring gear 132.

The fastener 108 includes a double-ended coupling element 144 which carries the forwardly directed shank portion 110 and a rearwardly directed shank portion 146 which is threadingly engageable with an axial bore 148 of the torque element 140. The shank portions 110 and 146 are separated by a hub portion 150 and an enlarged central flange 152 at the forward end of the hub. The hub acts as a spacer and mandrel for reception of a compression spring 154, such that the spring is confined between the flat end surface 136 of the fastener body and the central flange 152 of the coupling element when the fastener is assembled. This biases the threaded shank 110 forwardly relative to the head portion 112, while allowing the shank portion to be moved telescopically toward the fastener body against the force of the spring.

Assembly of the fastener 108 within the clearance opening 114 of a primary object is accomplished as illustrated in FIG. 6A. The head portion 112, with the torque element 140 located therein, is inserted into the clearance opening through the access bore 120, such that the fastener body is directed forwardly therein. The coupling element 144, with the spring 154 installed on the hub 150, is then moved from the full line condition to the phantom line condition of FIG. 6A and threaded by hand into the torque transmitting element 140. If the coupling element cannot be threaded far enough into the torque transmitting element by hand, it can be tightened further with a hollow assembly tool 156 having a pair of opposed lugs 158 which are engageable with a pair of notches 160 of the central flange 152. The tool is placed over the coupling element and rotated to further tighten the assembly.

When the fastener 108 is fully assembled within the primary object, the threaded shank portion 110 extends outwardly from the clearance opening unless it is forced inwardly under finger pressure or the like. In this condition, the fastener body is frictionally retained at the inner end of the clearance opening. The forward surface 161 of the head portion is preferably tapered in the forward direction, forming either a conical or a substantially spherically curved surface, so that it conforms closely to the diameter of the access hole along a horizontal plane (FIG. 6B). This permits rotation of the head portion by the drive tool discussed below and distributes the fastening force against the surface of the object.

Because the threaded shank 110 of the coupling element can be retracted within the clearance opening 114, it is possible to slide the secondary object 122 laterally along the outer face of the primary object so that the threaded insert 128 is aligned with the shank 110. This alignment procedure is illustrated in FIGS. 7A and 7B. Thus, the two objects can be assembled "nonprogessively" within their combined length in cases in which it is not possible to move one of the objects axially over the length of the fastener.

The drive tool 118 can be introduced into the access bore 120 before the secondary object is slid laterally relative to the primary object (FIG. 7A), or after the fastener has been retracted within the clearance opening and aligned with the threaded insert 124 of the secondary object (FIG. 7B). The supporting collar 126 has a cylindrical outer surface 162 which closely engages the access bore 120 to locate the tapered drive gear 128 in positive engagement with the fastener ring gear 130. The drive gear 128 is carried at the end of a drive shaft 164 for rotation relative to the supporting collar 126. A set screw 166 passes through the supporting collar and engages a suitable groove of the drive shaft to prevent movement of the shaft in an axial direction. The outer end of the collar 126 is preferably dished to receive the fastener head portion 112 and engage its spherically curved forward surface 161. Thus, the dished portion surrounds the drive gear 128 but provides space for engagement of the ring gear with the drive gear.

Because the coupling element 144 and the torque element 140 are slidably mounted relative to the head portion, the head portion remains in substantially the same axial position while it is tightened. Rotation of the head portion causes the torque element 140 and the coupling element 144 to rotate as well, advancing the shank 110 into the threaded insert 124. This continues until the elements are fully engaged, whereupon the enlarged head 142 of the torque element bears against the head portion to draw the primary and secondary objects tightly together. This is accomplished by continuous rotation of a drive shaft 164 through a connector portion 170, using either a simple wrench or a power tool. There is no need for repeated engagement and disengagement of the tool.

Figure 8:
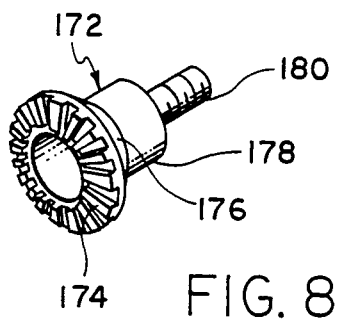
FIG. 8 is a perspective view of a further embodiment of a fastener constructed in accordance with the invention.

Another variational form of the fastener and drive tool structure of the present invention is illustrated in FIGS. 8-9, in which a fastener 172 is a one-piece rigid fastener body consisting of a rearwardly facing ring gear 174, a tapered or spherically curved surface 176, an enlarged shank portion 178 and a forwardly directed threaded shank portion 180. The fastener 172 is designed for use in many of the same circumstances as the fastener 108 of FIG. 5. It can be inserted into a primary object 116 by passing it through an access bore 120 to a clearance opening 114 which extends through the end of the primary object. As in the embodiment of FIGS. 5-7, the access bore and the clearance opening are preferably approximately normal to one another and have axes within a common plane.

The fastener 172 is preferably installed using a drive tool 182 having an annular support collar 184 which extends from a generally cylindrical surface portion 186 to a tapered or conical surface portion 188 at the outer end thereof. The tapered surface portion extends to a drive gear 190 similar in structure to the drive gears discussed above. The drive gear 190 is carried for rotation with a drive shaft 192 which is rotatable relative to the supporting collar 184.

Figure 9A:
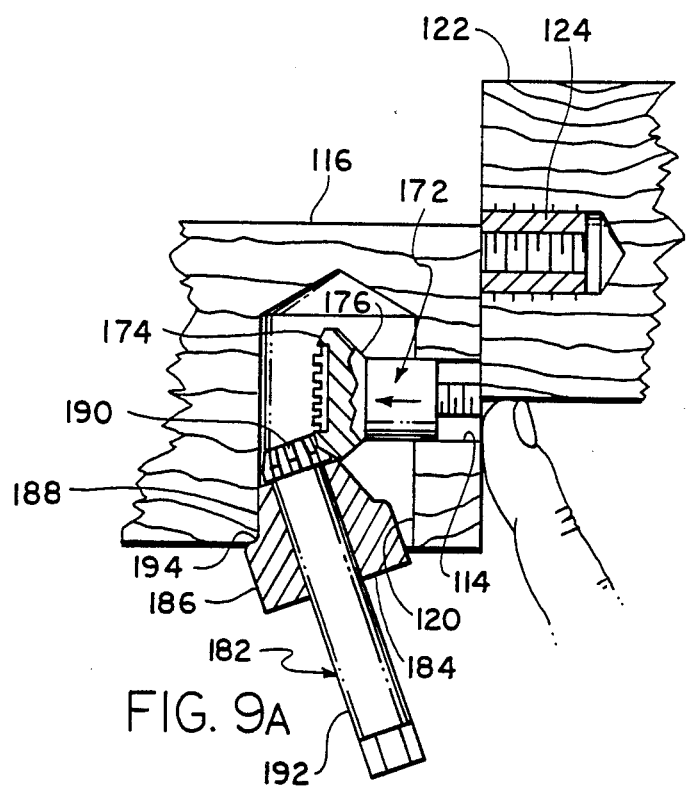
FIG. 9A is a partial vertical sectional view of the fastener of FIG. 8, in the process of being installed relative to two objects to be fastened together, and in conjunction with a corresponding drive tool constructed in accordance with the invention.
Figure 9B:
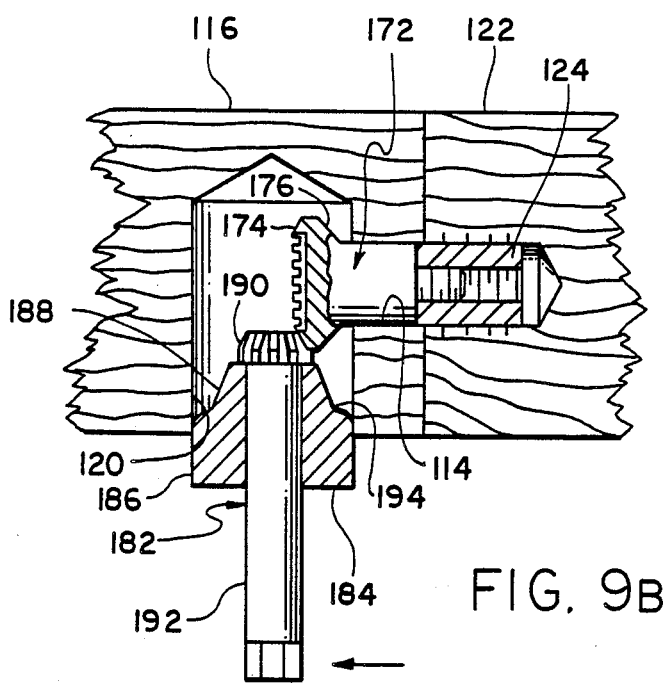
FIG. 9B is a partial vertical sectional view showing the fastener and drive tool of FIG. 9A in the fastened condition.

The drive gear is engageable with the ring gear 174 of the fastener in a range of axial positions of the fastener. Thus, the fastener can be retracted rearwardly within the clearance opening 114, as shown in FIG. 9A, to permit the secondary object 122 to be moved laterally across the end face of the primary object blank. When the insert 124 is aligned with the shank 180 of the fastener, the tool 182 is inserted to impart rotary driving force to the fastener through the gears 190 and 174. At this stage of assembly, the tapered surface portion 188 bears against the axial bore 120 to hold the drive gear forwardly against the ring gear of the fastener. As the fastener is tightened, it advances axially into the clearance opening 114, permitting the tool to be pivoted about a horizontal axis between the orientations of FIGS. 9A and 9B.

The surface of the supporting collar 184 acts as a fulcrum for pivotal movement as the drive gear 190 is urged forwardly against the ring gear 174. In the illustrated embodiment, a step 194 between the cylindrical surface portion 186 and the tapered surface portion 188 is provided for use as the fulcrum. Upon approaching the fully engaged condition of FIG. 9B, the tool 182 becomes aligned with the bore 120, permitting the cylindrical surface portion 186 to be received within the bore. Final tightening is accomplished in this condition, which provides the same angle of gear engagement as shown in FIGS. 7A and 7B.

Another variational form of the fastener and drive tool structure of the present invention is illustrated in FIG. 10, in which a fastener 200 has a head portion 202 and a forwardly directed threaded shank 204. The head portion is made up of a generally forwardly directed ring gear 206 which is similar in structure to the ring gear 14 of the fastener 10 (FIG. 1A) and is engageable with a pinion-type drive gear 208 of the drive tool 210.

The drive tool 210 may be identical to the drive tool 12 which is discussed above in connection with FIG. 2. It has an offset yoke 212 which is receivable over a cylindrical portion 214 directly behind the ring gear 206 of the fastener. The yoke 212 engages a rearwardly facing surface 216 of the fastener head to hold the drive gear 208 rearwardly in a condition of engagement with the ring gear 206. Although not required, a rear flange 218 can be provided behind the cylindrical portion 214 to hold the yoke in alignment with the fastener.

The fastener 200 operates in the same way as the fasteners 10 (FIG. 1A) and 76 (FIG. 4), except that the ring gear is directed primarily in the forward axial direction rather than in the rearward axial direction. The ring gear faces the workpiece to which it is applied, making it more difficult to remove the fastener without the disclosed drive tool. The fastener 200 is capable of serving a security function as well as a fastening function in such circumstances.

It will be appreciated that when the fastener of the present invention is provided with a forwardly facing ring gear, as disclosed in FIG. 10, it is necessary that the forward surface of the head be accessible for tightening. The fastener 200 has an enlarged shank portion 220 immediately in front of the head portion 206 for this purpose. When the fastener 200 is tightened against a workpiece, a forwardly directed annular surface 222 of the shank portion 220 abuts the workpiece, causing the ring gear 206 to be spaced the desired distance from the workpiece. The enlarged shank portion 220 is made long enough to provide access to the drive gear 208 during the tightening process.

From the above, it can be seen that there has been provided an improved fastener and drive tool combination for connecting two objects together when the best access is rather limited and is provided in a direction substantially perpendicular to the fastener. The fastening operation is accomplished by continuous rotation of a drive tool shaft, through engagement of complementary beveled gears.

While certain specific embodiments of the invention have been disclosed as typical, the invention is of course not limited to these particular forms, but rather is applicable broadly as to all such variations as fall within the scope of the appended claims. For example, it will be understood that the fastener having a forwardly facing ring gear may take any of a variety of useful forms, including many of those discussed herein with respect to fasteners having rearwardly facing ring gears. The only requirement is that sufficient space be provided ahead of the ring gear to engage the drive tool.

What is claimed is:

1. A gear headed fastener of single element construction rotatable about its axis by a drive gear, operated at substantially 90° to the axis of said fastener; said drive gear tool having a rotatable drive gear axially fixed therein; said fastener being joinable with a mating fastener component, when screwed in place by said tool for the purpose of joining two or more objects; said fastener having a head portion formed as a ring gear with an opposing flat annular thrust surface as a part thereof, and a cylindrical portion which is axially forward of the thrust surface; said fastener being formed preselectively either with an axial bore therethrough, which may be threaded as a gear headed nut, or instead of a bore, said fastener having a male threaded shank projecting axially forward of the cylindrical portion; said drive gear tool having a nonrotating body with a "U" shaped offset yoke portion into which said cylindrical portion of said fastener is firmly yet rotatably received; the axis of said fastener thereby being held substantially at 90° to the axis of said tool's drive gear, and whereby the teeth of said gear headed fastener and drive gear tool are engaged, and whereby said tool's drive gear is used to rotate said fastener about its axis while said tool's nonrotating body is used to remotely manipulate said fastener into alignment with a mating component, and remotely start screwing said fastener into threaded engagement with, and tighten said fastener to the mating component, so as to join two or more objects together.

2. Said gear headed fastener of claim 1 being rotatable about its axis by a drive gear, having a head portion including an axially rearwardly facing ring gear having a plurality of teeth for engagement with said drive gear tool; wherein the furthest rearward extension of said fastener in the axial direction terminates at the rearmost extremity of said ring gear teeth; wherein the outermost radial extremity of said fastener being the outermost radial extremity of said ring gear; said fastener having an axially forwardly facing flat annular thrust surface which is axially immediately forward of said ring gear, and thusly forms an opposite face of the latter; said fastener having a cylindrical portion directly forward axially of the flat annular thrust surface; said cylindrical portion being smaller in diameter than the outer rim of said ring gear and said thrust face; said cylindrical portion terminating axially forwardly in a second flat annular surface which is the clamping face or shoulder of the fastener when said fastener is tightened; said fastener having an axial bore which is threaded as a gear headed nut for screwing onto a mating threaded male component, such as a bolt or stud, so as to join two or more objects together.

3. Said gear headed fastener of claim 2 wherein said rearwardly facing ring gear is in the form of a bevel gear.

4. The gear headed fastener of claim 2 wherein said fastener has alternately, an axial bore which is polygonally shaped for introduction onto a mating male component such as a bayonet lugged post.

5. The gear headed fastener of claim 2 wherein said fastener has alternately instead of a bore, a forwardly axially extending threaded shank smaller in diameter than the cylindrical portion of said fastener as a gear headed machine screw; said threaded shank being screwable into a mating threaded female component.

6. The gear headed fastener of claim 2 wherein said fastener has alternately instead of a bore, a forwardly axially extending non-threaded shank smaller in diameter than the cylindrical portion of said fastener, with a bayonet type lug or lugs, at its forward end for introduction into a mating bored component.

7. The gear headed fastener of claim 2 wherein said fastener has alternately instead of a bore, a forwardly axially extending wood screw threaded shank smaller than the cylindrical portion of said fastener as a gear headed wood screw, for screwing into a softer material such as wood.

8. A drive gear tool of claim 1 wherein said tool is comprised of a tool body, a tool drive gear with a shaft which is rotatable within said body, and a tool drive gear shaft collar; said tool drive gear mates with said fastener ring gear; said tool body has a bore therein to receive said drive gear; said bore terminating at said tool body's upper or yoke end in a flat annular bearing surface; said bore terminating at said tool body's lower end in a second flat annular face; said tool body has an offset two fingered flat "U" shaped yoke extending forward of the upper end and parallel to the axis of said bore of said tool body; said yoke being for the purpose of receiving and holding said fastener therein with said fastener's axis at substantially 90° to the axis of said drive gear; said tool drive gear has a pinion type gear at one end of a shaft, said gear shaft being smaller in diameter than said pinion gear, thereby forming at the juncture of the pinion gear and the pinion gear shaft a flat annular thrust surface; said gear shaft having at its opposite end a polygonally shaped section such as would be engageable by a variety of common wrenching tools; said tool collar fits around and attaches to said gear shaft by means of a set screw or a pin; said pinion gear shaft rotates in the bore of said tool body with said gear's thrust surface shoulder bearing against the annular bearing surface of said tool body, at said tool body's upper or yoke end; said pinion gear shaft is held axially fixed within said tool body bore by said tool collar which is attached to said gear shaft where it protrudes from the lower end of said tool body; said gear shaft's polygonally shaped end remaining exposed for purposes of engagement with a wrench; said tool body may be fabricated to extend axially away from the yoke end to whatever length is required in the way of reach for the screwing applications anticipated; said tool body extension thereby forming a handle to hold the tool body from rotating, and facilitating said tool manipulation while said fastener is rotated into engagement with a mating component, by turning of the drive gear.

9. A drive gear tool of claim 8 wherein said drive gear tool has a pinion type gear rotatable within said bore of said tool body; said tool body having an offset "U" shaped flat yoke extending forward of and parallel to said pinion gear axis; said yoke having parallel fingers so spaced apart as to closely receive said cylindrical portion of said fastener therebetween, with said fastener's axis at substantially 90° to the axis of said tool's pinion gear; said yoke fingers being of a thickness in the direction 90° to the axis of the pinion gear, and said thickness thereby being parallel to the axis of said fastener when held therein; said thickness being less than the axial length of the cylindrical portion of said fastener, thereby allowing said fastener to be tightened down without clamping down on said fingers of said tool, thereby allowing said tool to be withdrawn after tightening said fastener; said fingers having imbedded therein one or more detents whose axes are parallel to the flat thrust surface of said fingers and directed inwardly on said yoke toward said fastener held therebetween, and so positioned as to allow the main diameter of the cylindrical portion of said fastener to pass within, "over-center", thereby holding said fastener rotatably in place; said tool yoke's inner face which is directed toward and is parallel to the axis of the bore of said tool body forms a flat "U" shaped bearing surface, to bear against said annular thrust surface of said fastener when it is in place in said tool yoke; said yoke bearing surface being so spaced away from the axis of the drive gear which rotates in the tool body bore, that as said fastener is pushed by hand into said yoke of said drive gear tool, said thrust surface of said fastener slides against said bearing surface of said yoke, and said cylindrical portion of said fastener is forced over-center past said detents, and simultaneously said ring gear of said fastener which faces said pinion gear is engaged with said pinion gear of said tool; thereby said fastener ring gear teeth and opposing thrust surface are sandwiched between said pinion gear and said "U" shaped bearing surface of said drive gear tool yoke; thereby said fastener is axially fixed therein, and is additionally rotatably fixed therein by said detents of said yoke; said fastener now being easily and reliably, yet rotatably maintained in said tool body yoke so that said fastener can be manipulated into engagement with its mating component while being held remotely at the end of said drive gear tool; the latter being held in whatever position required as said pinion gear is turned therein by hand or by wrench, to rotate said fastener being held therein, into engagement with, and tightened to its mating component.

10. A drive gear tool of claim 8 wherein said drive gear is a bevel gear.

11. A gear headed fastener of single element construction, rotatable about its axis by a drive gear, such as the drive gear described in claim 9; said fastener being joinable with a mating component by means of screwing; said fastener having a head portion including a forwardly facing ring gear having a plurality of teeth for engagement with said drive gear; said fastener having axially forward of said ring gear, a cylindrical portion terminating axially forwardly in a flat annular face which is the clamping face or shoulder of said fastener when the latter is tightened; said cylindrical portion extending axially forwardly a length sufficient to provide space for said pinion drive gear to occupy when engaged at 90° to said ring gear; said fastener having a threaded shank extending axially forwardly from said cylindrical portion; said shank being smaller in diameter than the cylindrical portion; said shank being screwable into a mating threaded female component for the purpose of joining two or more objects together; said fastener having a rearwardly facing flat annular thrust surface which is axially immediately rearward of said ring gear, and thusly forms an opposite face of the latter; said fastener having a second cylindrical portion directly rearward axially of said annular thrust surface; said second cylindrical portion being smaller in diameter than the outer rim of said ring gear and said thrust surface; said portion terminating rearwardly in a third cylindrical portion of larger diameter, approximately the same as that of said ring gear and said thrust face; said large cylindrical portion terminates rearwardly in a flat face which is the rearward extremity of said fastener.

12. The gear headed fastener of claim 11 wherein said ring gear is in the form of a forwardly facing bevel gear.

13. The gear headed fastener of claim 11 wherein said fastener has alternately instead of an axially extending threaded shank, an axial bore which is threaded as a gear headed nut for screwing onto a mating threaded male component, such as a bolt or stud.

14. A gear headed fastener of single element construction, being rotatable about its axis by a drive gear tool operated at substantially 90°; said fastener having a head portion including an axially rearwardly facing ring gear having a plurality of teeth for engagement with said drive gear tool; wherein the outermost radial extremity of said fastener being the outermost radial extremity of said ring gear; said fastener having an axially forwardly facing flat annular clamping surface or shoulder, which is axially immediately forward of said ring gear, and thusly forms an opposite face of the latter; said fastener having an axially forwardly extending threaded shank; said fastener having a cylindrical portion extending axially directly rearward of the ring gear; said cylindrical portion being smaller in diameter than the inner radial extremity of the teeth of said ring gear and of such a diameter as to be receivable within the yoke of said drive gear tool; said cylindrical portion terminating axially rearwardly in an axially forwardly facing flat annular thrust surface which is so spaced away axially from said ring gear, as to engage the bearing face of the yoke of said drive gear tool, thereby axially fixing said drive gear and assuring the engagement of the drive gear teeth with the fastener's ring gear teeth; said annular thrust surface terminating radially in a second cylindrical portion being of such a diameter as to assure clearance for the axial extremity of the drive gear tool gear teeth; said fastener being screwable into a mating threaded female component for the purpose of joining two or more objects together.

15. A drive gear tool comprised of a pinion type gear with a cylindrical shank which may be smaller in diameter than the gear; said shank terminating at its opposing end in a polygonally shaped section such as would be engageable by a variety of common wrenching tools; said drive gear tool being axially bored at its gear end to rotatably receive the shaft of a yoke; said yoke being shaped as a flat faced "U" with a round shaft extending down from the bottom thereof; said yoke shaft being frictionally pinned into said pinion gear shank bore so as to be axially fixed while being able to rotate; said yoke extending axially forwardly from said pinion gear; said yoke's fingers closely receiving therein the smaller cylindrical portion of said fastener of claim 14, thereby holding said fastener at substantially 90° to the axis of said tool; said yoke having a flat "U" shaped bearing surface on either face thereof, said bearing surfaces being at 90° to the axis of said pinion gear, and either surface of which can bear against the flat annular thrust surface of said fastener, thereby assuring engagement of the teeth of the tool's pinion gear and of the fastener's ring gear; said tool yoke fingers having detents for holding said fastener in place, whereby said tool yoke and said fastener it is holding remain stationary when the pinion gear is rotated, allowing the operator to manipulate said fastener for positioning, for alignment with, and screwing into a mating component for the purpose of joining two or more objects together.

16. The drive gear tool of claim 15 wherein said drive gear tool pinion gear is a bevel gear.

* * * * *